United States Patent [19] [11] 4,119,808
Atkin [45] Oct. 10, 1978

[54] MULTI-FREQUENCY RECEIVER CIRCUITS

[75] Inventor: Michael Frank Atkin, Fife, Scotland

[73] Assignee: General Instrument Corporation, Clifton, N.J.

[21] Appl. No.: 806,585

[22] Filed: Jun. 15, 1977

[30] Foreign Application Priority Data

Jun. 17, 1976 [GB] United Kingdom ............... 25227/76

[51] Int. Cl.² ............................................. H04M 1/50
[52] U.S. Cl. .............................. 179/84 VF; 324/78 D
[58] Field of Search ................ 179/84 VF; 324/78 D; 328/138, 139, 140

[56] References Cited

U.S. PATENT DOCUMENTS

| 3,537,001 | 10/1970 | Friend | 179/84 VF |
| 3,760,269 | 9/1973 | Beeman | 179/84 VF |
| 3,790,720 | 2/1974 | Schartmann | 179/84 VF |

Primary Examiner—Kathleen H. Claffy
Assistant Examiner—Joseph A. Popek
Attorney, Agent, or Firm—James & Franklin

[57] ABSTRACT

A receiver circuit for a multi-frequency telephone dialling system has means for validating a received tone by making successive measurements of the tone period and validating the tone when m of n successive measurements lie within a single one of a number of given ranges and when, subsequently, $l(< m)$ of $n$ successive measurements of the tone also lie within that single range.

10 Claims, 11 Drawing Figures

MULTI-FREQUENCY RECEIVER CIRCUITS

BACKGROUND OF THE INVENTION

The present invention relates to frequency receiver circuits and is particularly applicable in the field of multi-frequency telephone dialling systems.

It is useful to be able to verify that a received signal frequency or tone is valid i.e. that it satisfies certain predetermined conditions. These conditions may relate to the tolerance on the magnitude of the frequency, to the duration of the signal at that frequency and to the length of time for which, if it is valid, the frequency remains valid. It is therefore useful to record the past history of the tone accuracy. This record can be made by sampling the frequency a plurality of times and determining the fraction of the samples which are within a particular frequency band. If the fraction is greater than a predetermined fraction, the frequency or tone can be accepted as being valid. However, such a technique alone may not give good results in the presence of high noise.

SUMMARY OF THE INVENTION

According to the present invention, there is provided a signal processor comprising: an input for receiving a periodic signal; measuring means coupled to the input for making successive measurements of the periodic signal to determine with each measurement whether the period of the signal has a value lying within any one of a plurality of predetermined space ranges of values; means coupled to the measuring means for producing an output signal if the determined value falls within a single one of the ranges more than a first predetermined number of times in a group of a given number of successive measurements and for continuing to produce said output signal if in the following such group the value falls within the same single one of the ranges more than a second predetermined number of times less than the first predetermined number; and means for storing an identification of said single one of the ranges during the production of said output signal to provide an identification of the period of the periodic signal.

BRIEF DESCRIPTION OF THE FIGURES

For a better understanding of the invention and to show how the same may be carried into effect, reference will now be made, by way of example, to the accompanying drawings in which:

FIG. 7 (comprised of FIG. 7a and 7b) is a circuit diagram of a matrix and output logic of the circuit of FIG. 1;

DESCRIPTION OF SPECIFIC EMBODIMENTS

The illustrated multi-frequency receiver circuit is intended to receive, validate and identify dialling signals each composed of two frequencies.

In this example a 2-out-of-8 system of frequency coding is assumed with each digit being represented by one out of a group of four relatively high frequencies and one out of a group of four relatively low frequencies.

Figure 1:
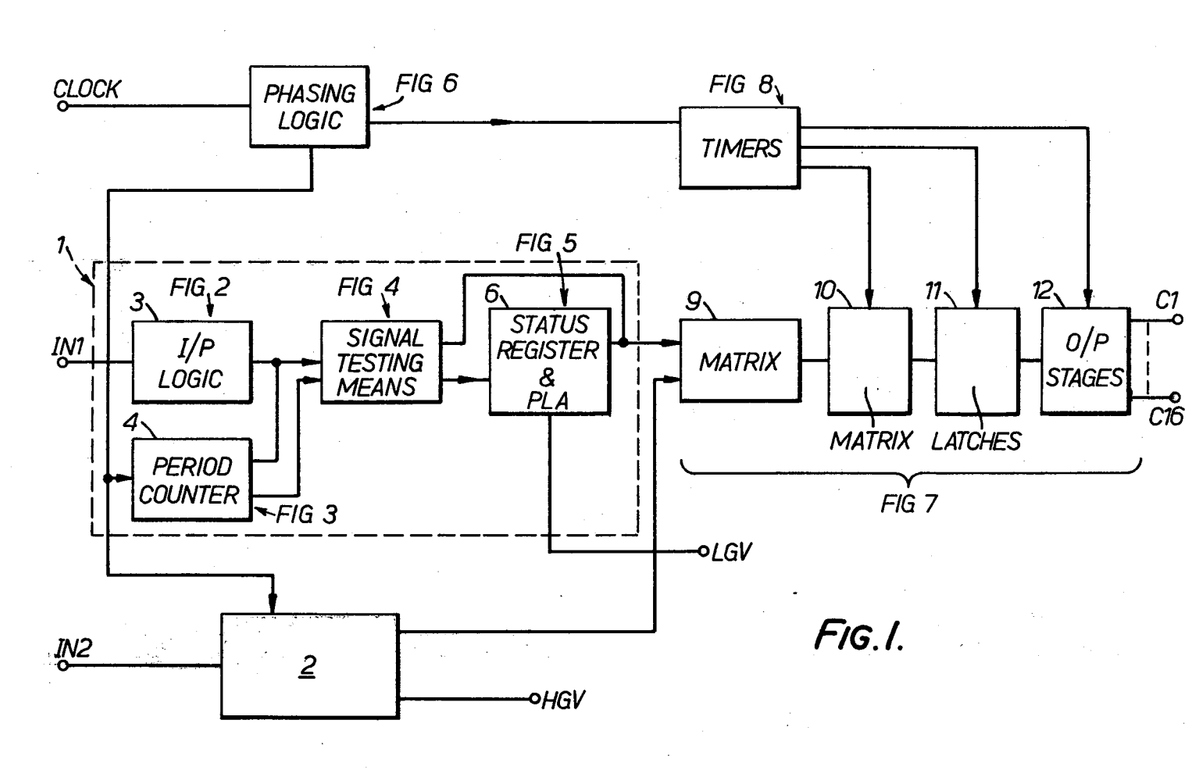
FIG. 1 is a schematic diagram of a multi-frequency receiver circuit for receiving and validating dialling tones in a multi-frequency telephone signalling system.
Figure 2:
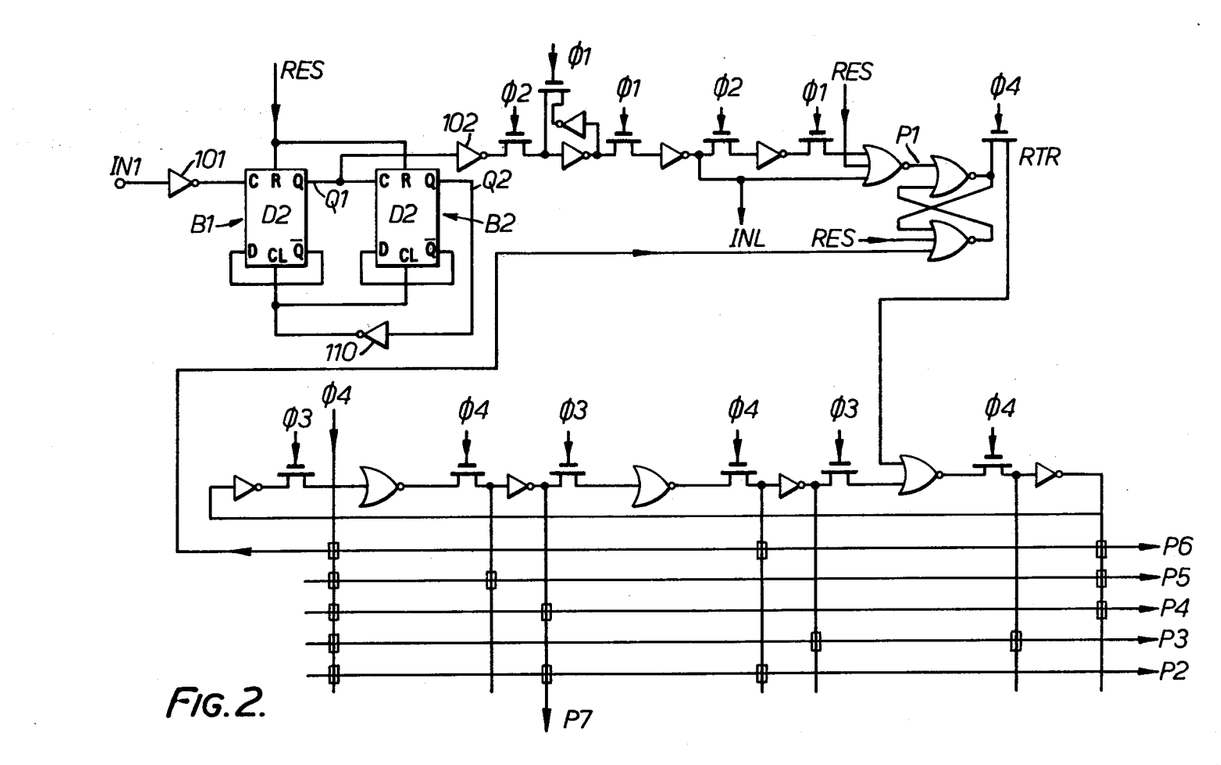
FIG. 2 is a circuit diagram of input logic of the circuit of FIG. 1.
Figure 3:
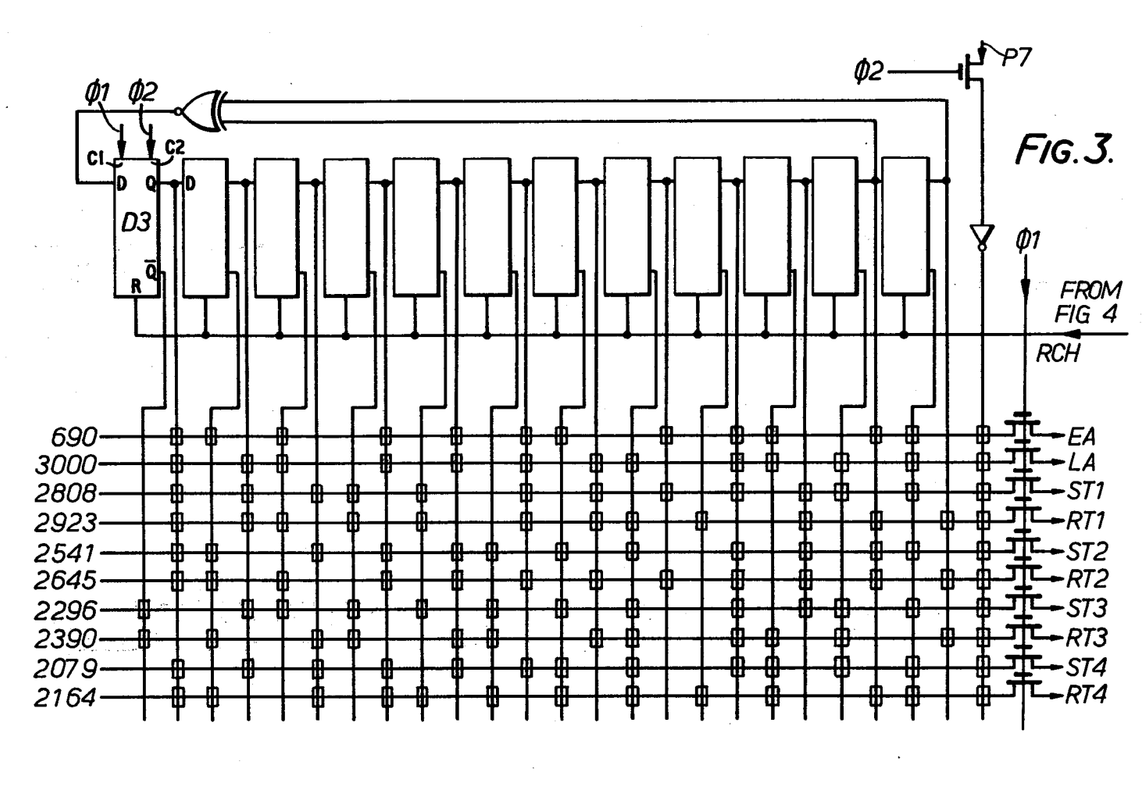
FIG. 3 is a circuit diagram of a period counter of the circuit of FIG. 1.
Figure 4:
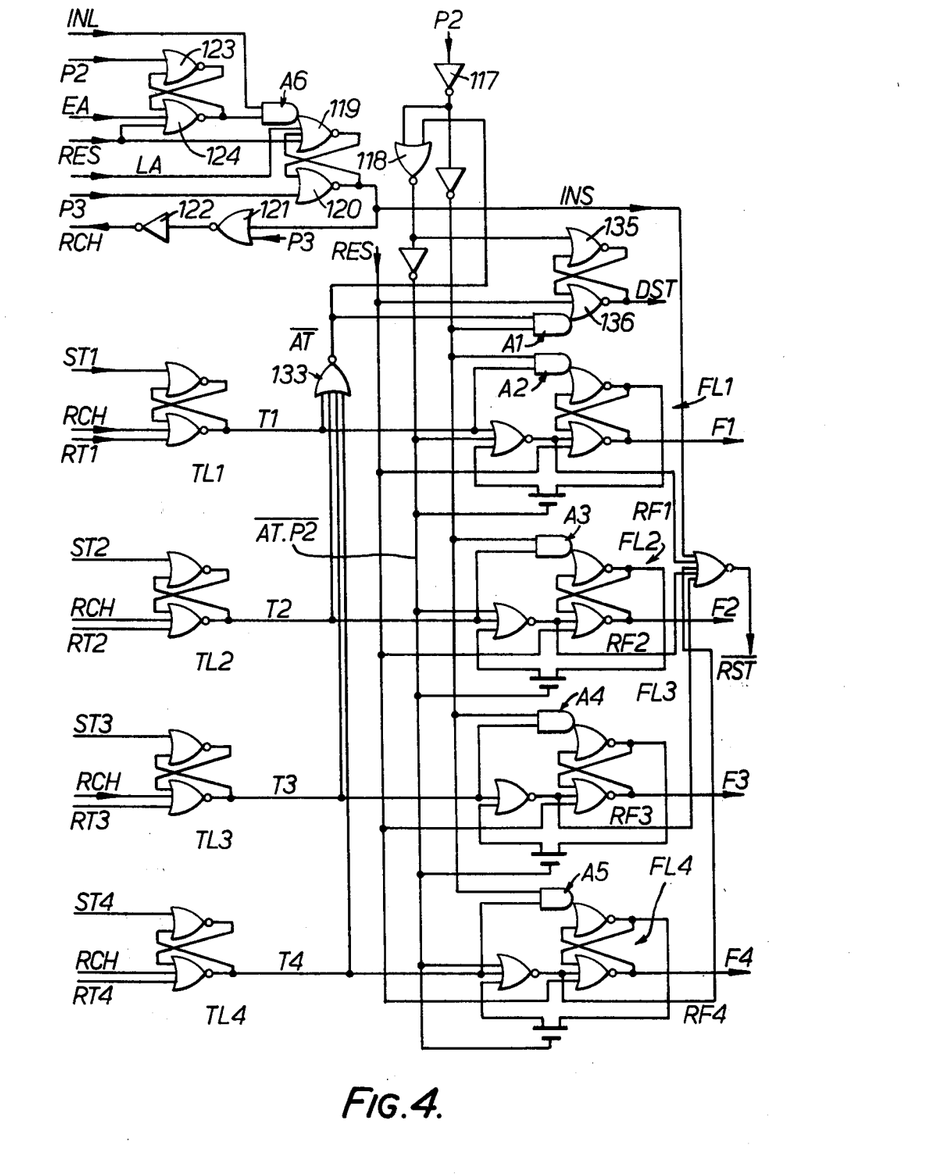
FIG. 4 is a circuit diagram of signal test logic of the circuit of FIG. 1.
Figure 5:
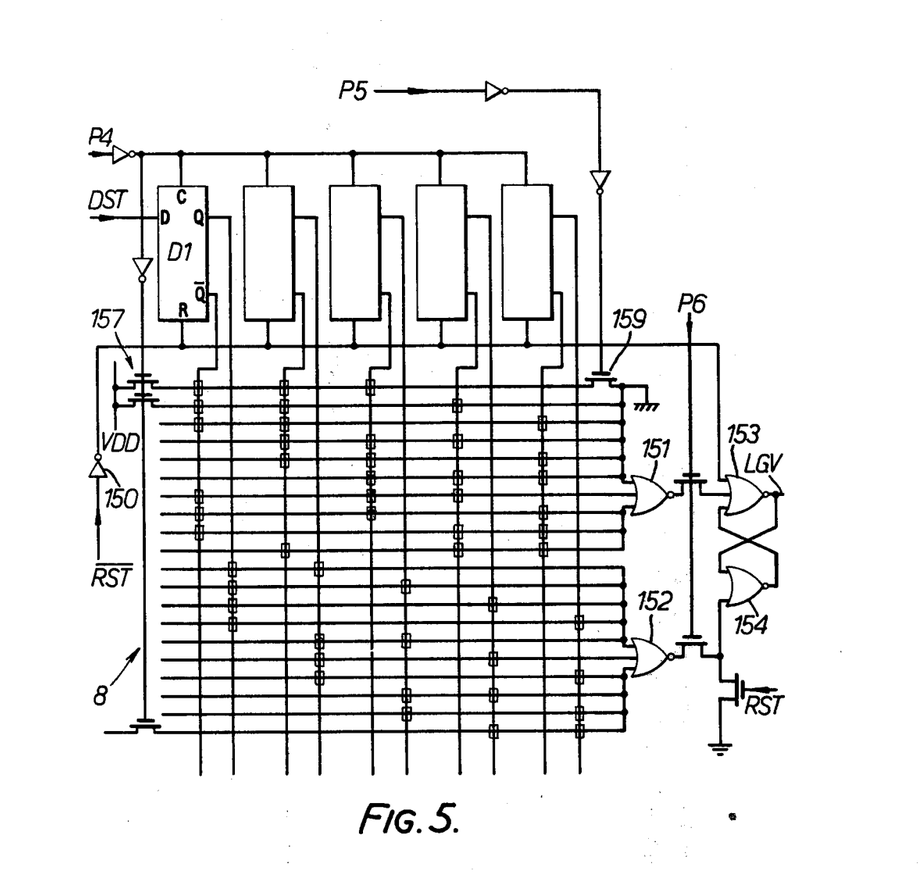
FIG. 5 is a circuit diagram of a status register and logic array of the circuit of FIG. 1.
Figure 6:
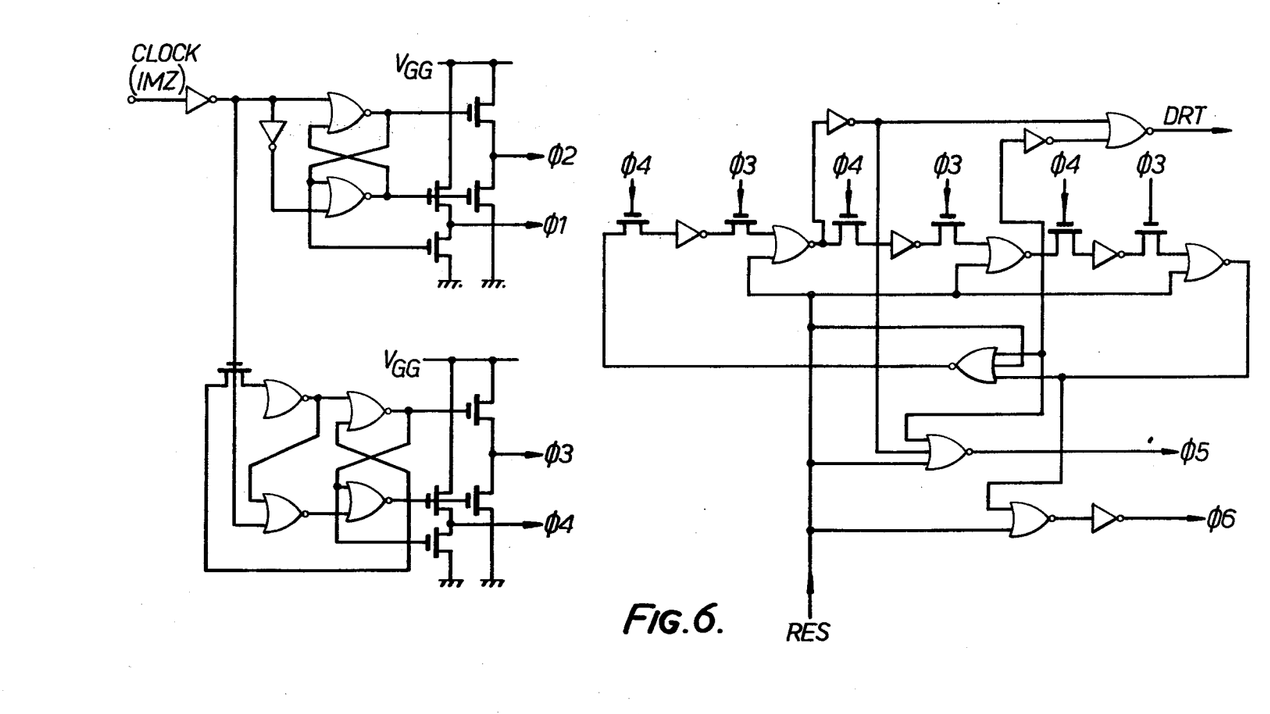
FIG. 6 is a circuit diagram of phasing logic of the circuit of FIG. 1.

The receiver circuit comprises two signal validating blocks 1 and 2 (FIG. 1) for respective groups and only block 1 is described in detail hereinafter as both blocks have corresponding elements. Each block comprises: input logic 3 (FIGS. 1 and 2) for receiving and processing an input signal; a period counter (FIGS. 1 and 3) for counting clock signals to produce signals at predetermined intervals of time; signal testing means 5 (FIGS. 1 and 4) connected to receive signals from the logic 3 and counter 4 for testing the period duration of the signals received by logic 3; and a status register and associated programmable logic array (PLA) 6 (FIGS. 1 and 5). It can be seen from FIGS. 1 to 5 that each of blocks 1 and 2 is connected to receive an input signal, on lines IN1 and IN2 respectively, and to receive four clock signals denoted 01, 02, 03 and 04 which are derived from a common clock source having a frequency of 1MHz, by way of phasing logic 7 (FIGS. 1 and 6).

Figure 9:
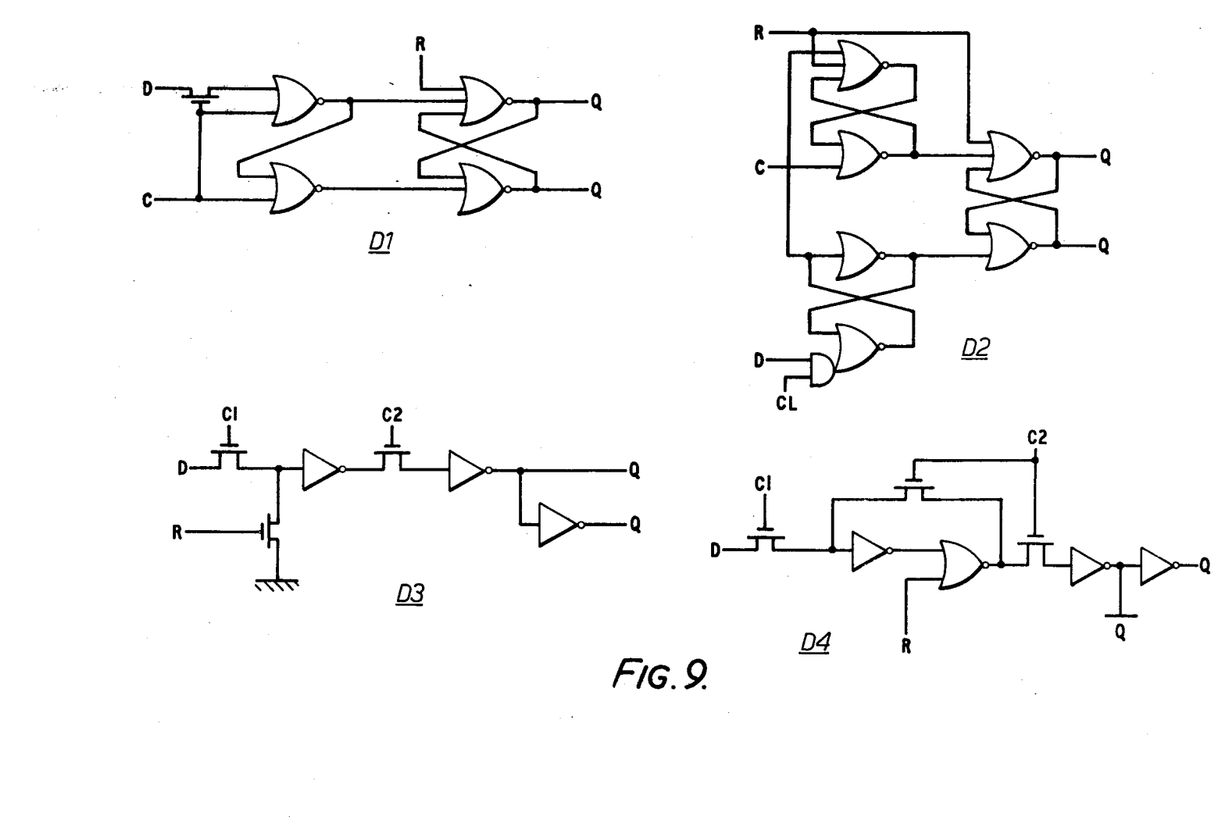
FIG. 9 is a circuit diagram of four bistable circuits of the circuit of FIG. 1.

Input logic block 3 of validating block 1 receives, besides signal IN1, signals 01, 02, 03 and 04 and a "power on" reset signal denoted RES. Logic block 3 produces signals INL and P2 to P7. Signal IN1 is taken, by way of inverter 101, into the C clock input of a D2 type (FIG. 9) bistable B1 whose $\overline{Q}$ output is connected to its own D input and whose Q output Q1 feeds the C input of a further D2 type bistable B2, whose $\overline{Q}$ output is connected to its own D input. Both D2 type bistables are fed at their clocked clear inputs CL by the Q output Q2 of the further D2 bistable B2 by way of an inverter 110. Reference to the internal logic of these D type bistables B1 and B2 in FIG. 9 shows that input C forms the clock input whilst input CL is the clocked clear input. The operation of the circuit is as follows: Normally inverter 110 has no input and therefore with inverter 102 having its input from Q1 (or Q2 in an alternative) the circuit divides by 2 (or 4). If inverter 110 has its input from Q2 and inverter 102 has its input from Q2 also, the circuit divides by 3.

The frequency detection system then operates over 2, 3 or 4 cycles of the input signal depending on which option is chosen. Since this results in the period counter counting for a longer time the accuracy of the system is increased although the main reason for this logic is to eliminate the effect of variations in mark/space ratio of the input signal. The basic form is to divide by 2 only, the other options being nevertheless available during manufacture if required.

The signal on the Q1 output of bistable B1 (or Q2 of bistable B2) is taken through a succession of inverters and switches to a matrix array which derives the plurality of signals P2 to P7 and INL. Signal P2 defines the period between two successive edges of the signal Q1 (or Q2) and thus indicates the period of the input signal IN1. Signal P4 is used for clocking the status register and has a frequency equal to that of P2, but delayed in time to allow the signal testing means 5 to operate before the status register 6 is clocked.

The signal testing means 5 (FIG. 4) comprises four circuits TL1 to TL4 acting as timeslot latches which indicate the passage of four respective time slots by producing respective signals T1 to T4. These timeslots are timed by counter 4 (FIG. 3) which produces a signal ST1 at the beginning of the first timeslot T1 and a signal RT1 at the end of the first timeslot. It also produces signals ST2, RT2, ST3, RT3, ST4 and RT4 which similarly define second, third and fourth time-slots. These time-slots define the period ranges for the four frequencies of the group.

The outputs of the four timeslot latches are connected to a NOR gate 133 whose output $\overline{AT}$ thus indicates whether or not any of the timeslots are being counted at that moment. This output $\overline{AT}$ is connected to an AND gate A1 and also to a NOR gate 118 which receives signal $\overline{P2}$ from input logic 3 by way of inverter 117. Thus the output of NOR gate 118 is a signal representing AT. P2 which therefore is "true" when the instantaneous time is within a time-slot and signal P2 is "true". This condition causes a latch arrangement, comprising NOR gates 135 and 136, to produce a "true" signal DST at the output of gate 136. This signal DST thus indicates that the last sample of the signal detected at the input of input logic 3 was in one of the frequency bands.

The time-slot latches TL1 to TL4 are arranged to feed respective frequency latches FL1 to FL4. The output signals T1 to T4 of respective latches TL1 to TL4 are taken to respective AND gates A2 to A5 associated with respective ones of the frequency latches FL1 to FL4. Another input of each of AND gates A2 to A5 receives signal P2 from input logic 3. Thus, when signals T1 and P2 are both "true", frequency latch FL1 is set and an output signal F1 of latch FL1 goes "true". Similarly, signals F2 to F4 associated with respective latches FL2 to FL4 indicate whether signal P2 has occurred in their associated time slots.

Signal testing means 5 also comprises a resetting arrangement comprising gates 119 to 124 and AND gate A6. This arrangement receives a "power on reset" signal which is a general reset signal labelled RES, for resetting all resettable logic elements when power is applied to the circuit, and also receives signals P2, P3 and INL from input logic 3. These signals P2, P3 and INL define the sampling periods, and the resetting arrangement operates on these signals to produce, via inverter 122, a signal RCH for resetting the period counter 4 and the four time-slot latches TL1 to TL4 at the beginning of each sampling period. The resetting arrangement at gates 124 and 119 also receives two further signals from the period counter, one of which signals indicates that the counter has reached a count greater than that corresponding to the period of the lowest possible valid frequency of input signal IN1 and the other of which indicates a low count. If the input signal is a higher frequency than normally acceptable (such as noise or bounce on the line), then the first negative edge of the input signal will occur earlier than normal. This is detected by gate A6 which compares the input signal INL with bistable 123/124 which is set by P2 and reset by the "early count" signal from the period counter. If the period counter counts for much longer than the period of the lowest frequency bistable 119/120 is set and the period counter is reset.

Both of these resetting actions result in the reset being held by the bistables until the next positive edge of the input signal is seen. This resetting arrangement operates to reset period counter 4 and the four time-slot latches by way of inverter 122 and also, by producing a signal INS, to reset the status register 6 by way of a NOR gate 149 (FIG. 4) and an inverter 150 (FIG. 5). Signals from respective frequency latches FL1 to FL4 are also taken to NOR gate 149 so that the status register 6 will be reset on a change in that one of the frequency latches which is set, i.e. on a change in frequency of the input signal from one band to another.

The status register thus has a '1' inserted into it each time the period of the input signal is within one of the bands and this '1' is moved through the register at the end of every sample. Thus, if five consecutive valid samples at one frequency are received, the register will contain five '1's. If another frequency latch becomes set, the register is cleared and a single '1' inserted.

Figure 7A:
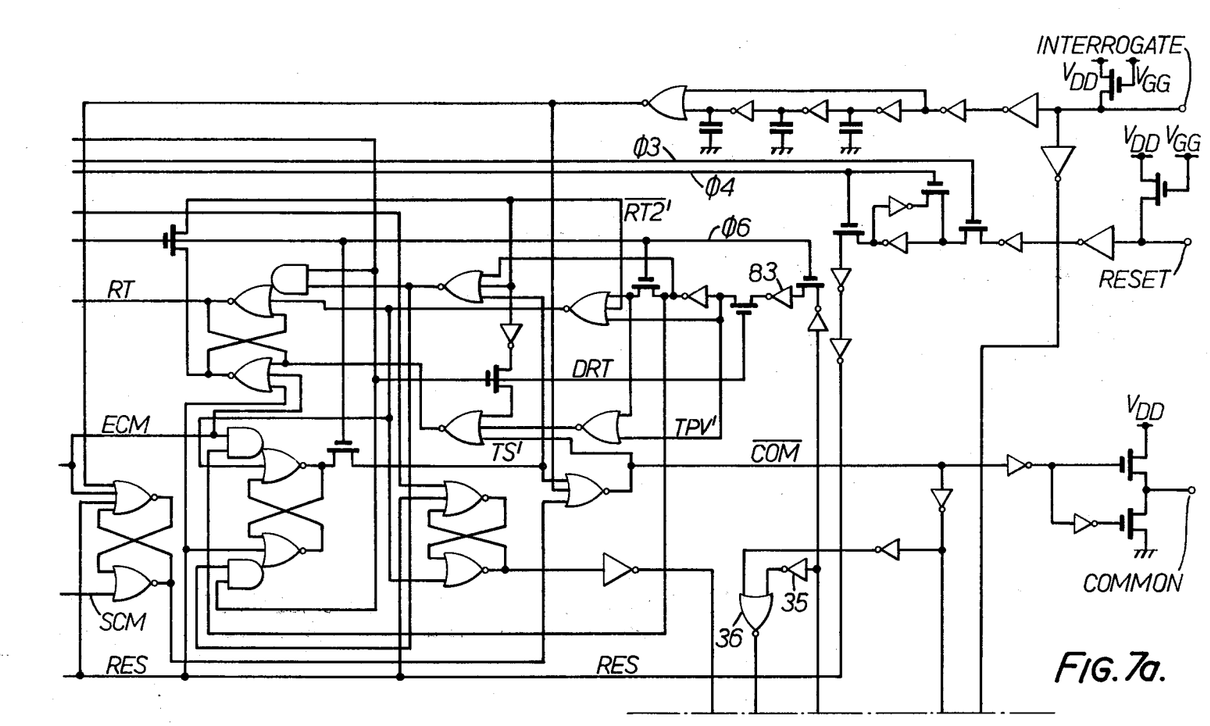
Figure 7B:
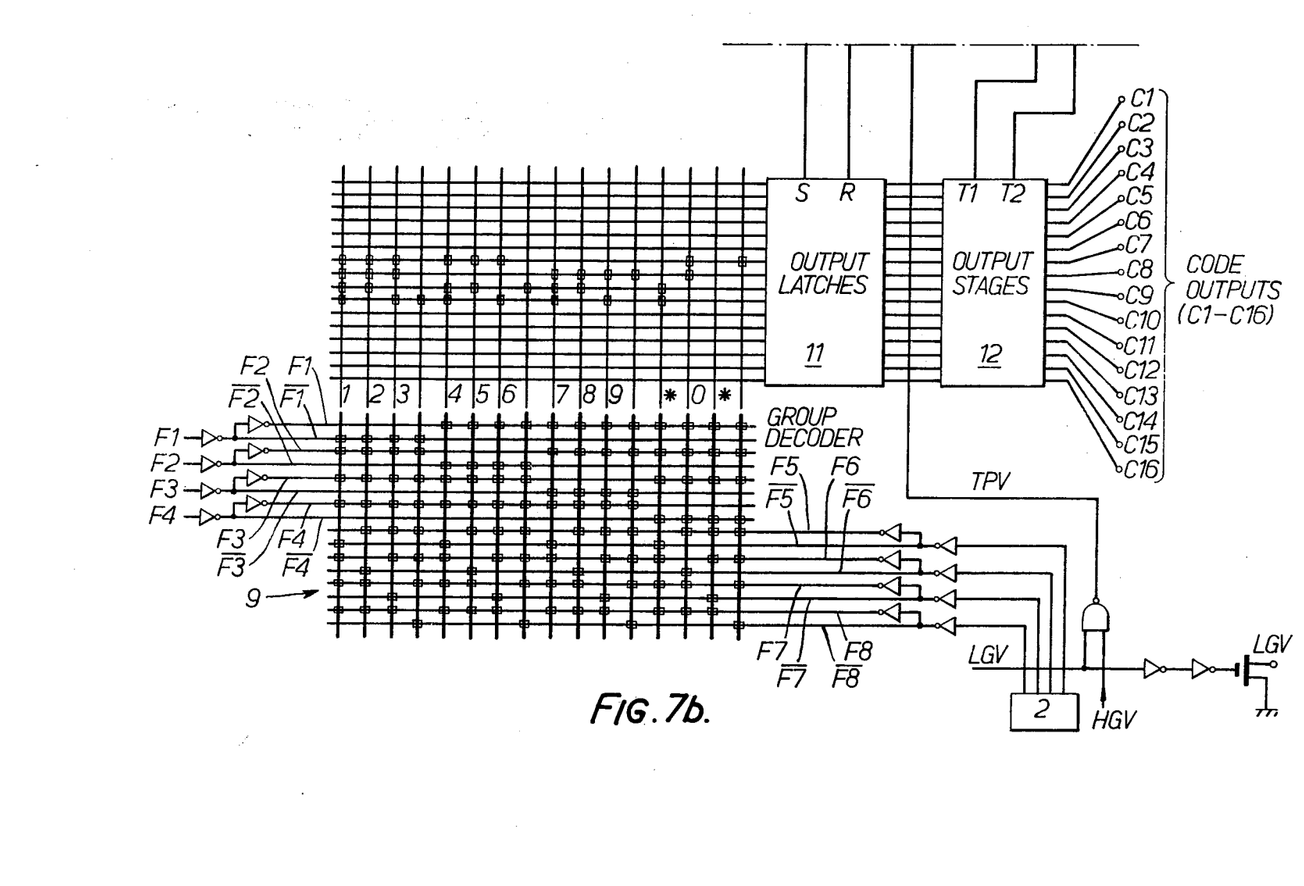

The output of the register feeds a programmable logic array 8 having output gates 151 and 152 which set and reset a bistable circuit 153, 154 which feeds an output LGV defining whether or not the low group frequency is valid. The validity signal also proceeds with the corresponding signal for the high group to a NAND gate 49 to code outputs C1 to C16 (FIG. 7). The gates 151 and 152 are programmed by the array to decode bit patterns of '0's and '1's in the register. For example, the first may be programmed to decode four out of five '1's in order to set the bistable circuit 153, 154, i.e. to determine validity. Then, the second might be programmed to decode two out of five, i.e, to cause the bistable circuit to be reset if only one '1' appears in the register. The rows of the matrix 8 are precharged by signal $\overline{P4}$ and transistors 157 and the rows are discharged in pairs by signal P6 and transistors one of which is shown at 159.

Thus validity is assumed once four out of five tests are positive and validity is then further assumed until only one out of five tests is positive in subsequent tests.

The actual latches set in the low and high group circuits are denoted by the application of signals to a programmable matrix 9 (FIG. 7) the output of which is encoded by a matrix 10 into 16 bits fed by output latches 11 and output stages 12 to the outputs of C1 to C16.

Figure 8:
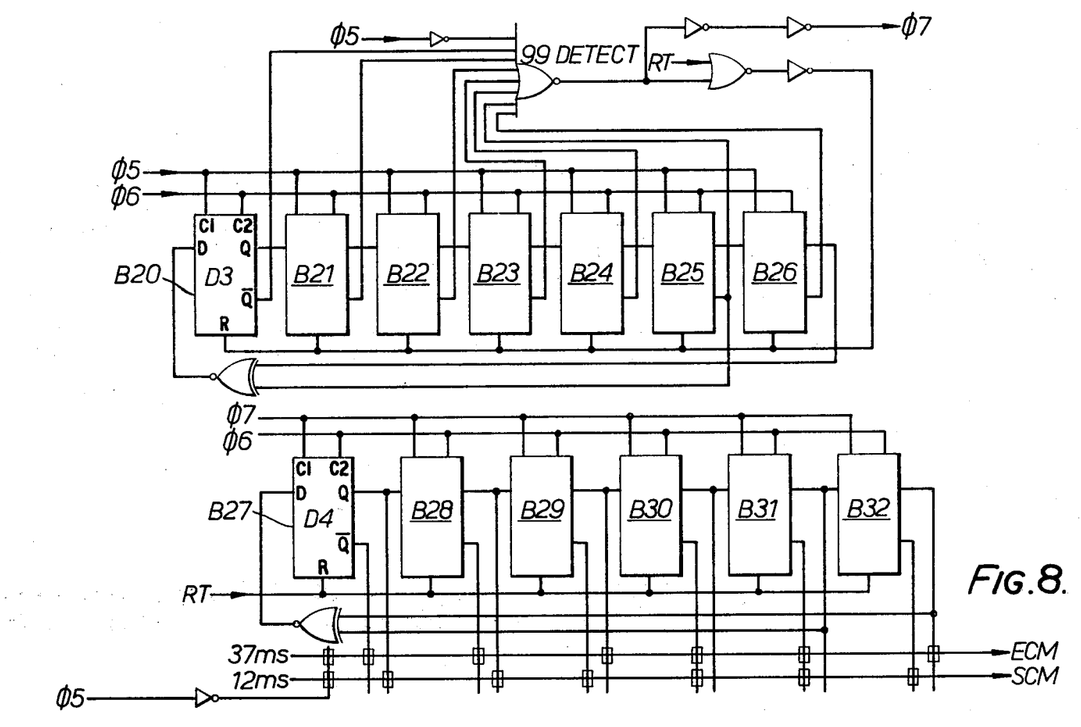
FIG. 8 is a circuit diagram of timers of the circuit of FIG. 1.

The output latches and stages 11 and 12 are also gated by output timers (FIG. 8) B20 to B32 (typically for 15ms) controlled by the output of the "validity" gate 49. The timer B27 and B32 has a programmable matrix to preset the time concerned.

The function of the output timers is to count out a predetermined time during which the input tone pair must remain valid. The count starts when signal TPV (FIG. 6) goes to '0' and will stop if TPV goes to '1' at any time. However, if this time elapses without the tone pair changing, the common output signal will go to '0' for a predetermined time regardless of the state of TPV. One logic '0' common output pulse only will be produced per valid tone pair.

When TPV goes to 1 (end of valid tone pair) the timers will restart and will count out the full time out period and common output period, without producing a common output pulse. In this mode, once started, the count will not stop until the final count is reached, the counter being oblivious to the state of TPV during this time. At the end of this count a 1-0 edge of the TPV signal will re-initiate the count.

The output timers thus ensure that a tone pair, once accepted as valid, must be present for a certain pre-programmed time and after this time a pulse of a certain pre-programmed width will always be produced on the common output. They also ensure that two tone pair signals must be separated by a minimum period before they are accepted as valid.

Figure 10:
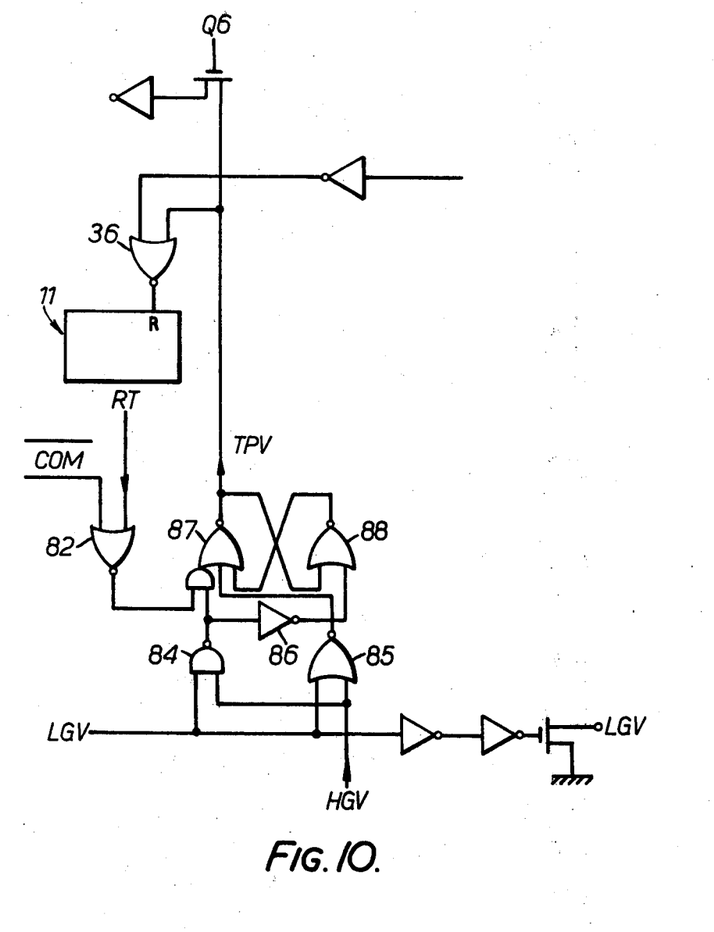
FIG. 10 shows a modification of FIG. 7.

FIG. 10 shows a modification to a portion of FIG. 7 for producing TPV. The logic sense of TPV is now inverted such that a 0-1 edge of the TPV signal indicates acceptance of the two input frequencies. The timers will begin counting when TPV goes to '1' and will reset when TPV goes to '0'. Bistables 87 and 88 generate TPV as follows. When LGV and HGV are '0' (before any tones received) gate 82 will be at '0' and TPV will be at '0'. If LGV and HGV go to '1', then gate 86 will go to '1' and the bistable will be set so that TPV goes to '1'. This starts the count sequence as described for FIG. 7 and will also cause gate 82 to go to '1'. If, before the common pulse occurs, HGV or LGV goes to '0', the bistable will be reset causing TPV to go to '0' and the output timer to reset. However, if LGV and HGV are at '1' long enough for the common pulse to begin, 82 will go back to '0' and TVP will stay at '1' until both LGV and HGV go to '0'.

This modification is to ensure that only one common pulse will occur when one of either LGV or HGV is at '1' all the time whilst the other alternates between '0' and '1'. This can be caused by one tone being present continually with the other tone applied periodically, as happens in telephony applications.

I claim:

1. A signal processor comprising: an input for receiving a periodic signal; measuring means coupled to the input for making successive measurements of the periodic signal to determine with each measurement whether the period of the signal has a value lying within any one of a plurality of predetermined spaced ranges of values; means coupled to the measuring means for producing an output signal if the determined value falls within a single one of the ranges more than a first predetermined number of times in a group of a given number of successive measurements and for continuing to produce said output signal if in the following such group the value falls within the same signal one of the ranges more than a second predetermined number of times less than the first predetermined number; and means for storing an identification of said single one of the ranges during the production of said output signal to provide an identification of the period of the periodic signal.

2. A processor as claimed in claim 1, wherein the means for producing the output signal comprises a shift register having at least a number of stages equal to said given number of successive measurements and into which the results of the measurements are fed and gate means for detecting from the states of the stages of the register the first and the second predetermined number of successful measurements.

3. A processor as claimed in claim 1, wherein the given number of scuccessive measurements is at least five, the first predetermined number is three and the second predetermined number is one.

4. A circuit for detecting two frequencies in respective ranges and comprising first and second signal processors each as claimed in claim 1 and means responsive to detect output signals from both processors, the values of the ranges of the first processor all being below the values of the ranges of the second processor.

5. A circuit as claimed in claim 4, wherein the responsive means produces a signal only when the output signals of the processors have existed for a predetermined time.

6. A processor as claimed in claim 1, wherein the measuring means comprises: input logic for producing from the periodic signal pulses defining the beginning and end of periods of the periodic signal; a period counter operable to produce a plurality of pulse trains defining respective ones of said ranges of values; and signal testing means connected to receive the pulses from the input logic and the trains from the period counter for making a comparison between the pulses and trains to determine which, if any, one of said ranges encompasses the period of the periodic signal.

7. A processor as claimed in claim 6, wherein the means for producing the output signal comprises a shift register having at least a number of stages equal to said given number of successive measurements and into which the results of the measurements are fed and gate means for detecting from the states of the stages of the register the first and the second predetermined number of successful measurements.

8. A processor as claimed in claim 7, wherein the given number of successive measurements is at least five, the first predetermined number is three and the second predetermined number is one.

9. A circuit for detecting two frequencies in respective ranges and comprising first and second signal processors each as claimed in claim 8 and means responsive to detect output signals from both processors, the values of the ranges of the first processor all being below the values of the ranges of the second processor.

10. A circuit as claimed in claim 9, wherein the responsive means produces a signal only when the output signals of the processors have existed for a predetermined time.

* * * * *